(12) United States Patent
Chen et al.

(10) Patent No.: US 8,667,154 B1
(45) Date of Patent: Mar. 4, 2014

(54) AUTHENTICATION OF UNKNOWN PARTIES IN SECURE COMPUTER COMMUNICATIONS

(75) Inventors: Jerry Jen-Chih Chen, Taipei (TW); Li Chia, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 310 days.

(21) Appl. No.: 13/085,266

(22) Filed: Apr. 12, 2011

Related U.S. Application Data

(62) Division of application No. 11/899,429, filed on Sep. 5, 2007, now Pat. No. 7,949,771.

(51) Int. Cl.
*G06F 15/16* (2006.01)

(52) U.S. Cl.
USPC ........... 709/229; 713/155; 713/156; 713/166; 713/168; 713/176

(58) Field of Classification Search
USPC .......... 709/229; 713/152, 155, 156, 166, 168, 713/173, 176, 177, 180
See application file for complete search history.

(56) References Cited

U.S. PATENT DOCUMENTS

| | | | |
|---|---|---|---|
| 2006/0294381 A1* | 12/2006 | Mitchell et al. | 713/173 |
| 2007/0180225 A1* | 8/2007 | Schmidt | 713/152 |

* cited by examiner

*Primary Examiner* — Yves Dalencourt
(74) *Attorney, Agent, or Firm* — Okamoto & Benedicto LLP

(57) ABSTRACT

Authentication of an unknown party in a secure computer communication may be performed even without consulting a public whitelist of trusted parties. A digital certificate from an unknown party not authenticated by a trusted certificate authority may be locally processed to determine if the digital certificate is a trusted, non-trusted, or unknown digital certificate. For example, a model may be created by training a support vector machine to classify a digital certificate. The model may be provided to a computer involved in secure computer communication. The computer may receive an incoming digital certificate, extract fields from the incoming digital certificate, and take a hash of the extracted fields perform input data that may be employed by the model to determine if the incoming digital certificate is a trusted, non-trusted, or unknown digital certificate.

5 Claims, 3 Drawing Sheets

AUTHENTICATION OF UNKNOWN PARTIES IN SECURE COMPUTER COMMUNICATIONS

CROSS-REFERENCE TO RELATED APPLICATION

This application is a divisional of U.S. application Ser. No. 11/899,429, filed on Sep. 5, 2007, which is incorporated herein by reference in its entirety.

BACKGROUND OF THE INVENTION

1. Field of the Invention

The present invention relates generally to computer security, and more particularly but not exclusively to methods and apparatus for performing secure computer communications.

2. Description of the Background Art

The secure socket layer (SSL) protocol is widely used in secure computer communications. The SSL protocol is based on a hierarchy of trust where one party, referred to as a "certificate authority" or CA, authenticates another party. The authenticated party becomes trustworthy to all other parties trusting its certificate authority. There is a root authority every party trusts in order to use the SSL protocol.

A digital certificate, or simply "certificate," is a binary signature used to uniquely identify a party. Current implementations of certificate authentication require either a certain number of trusted certificate authorities or that all parties involved in the communication have access to a public white list with a coded or un-coded representation of trusted parties and their corresponding certificates. When an unknown party without a trusted authenticator needs authentication, the unknown party is treated as a certificate authority and its certificate is compared to the public white list.

The unknown party is deemed trustworthy if its certificate identifies it as being included in the public white list. Otherwise, the unknown party is deemed un-trustworthy. Although workable, the public white list system for authenticating unknown parties poses some problems including the relatively large size of the white list and the vulnerability of the white list to tampering.

SUMMARY

In one embodiment, authentication of an unknown party in a secure computer communication may be performed even without consulting a public whitelist of trusted parties. A digital certificate from an unknown party not authenticated by a trusted certificate authority may be locally processed to determine if the digital certificate is a trusted, non-trusted, or unknown digital certificate. For example, a model may be created by training a support vector machine to classify a digital certificate. The model may be provided to a computer involved in secure computer communication. The computer may receive an incoming digital certificate, extract fields from the incoming digital certificate, and take a hash of the extracted fields to form input data that may be employed by the model to determine if the incoming digital certificate is a trusted, non-trusted, or unknown digital certificate. The secure computer communication may be in accordance with the SSL protocol and the incoming digital certificate may comprise an SSL certificate, for example.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
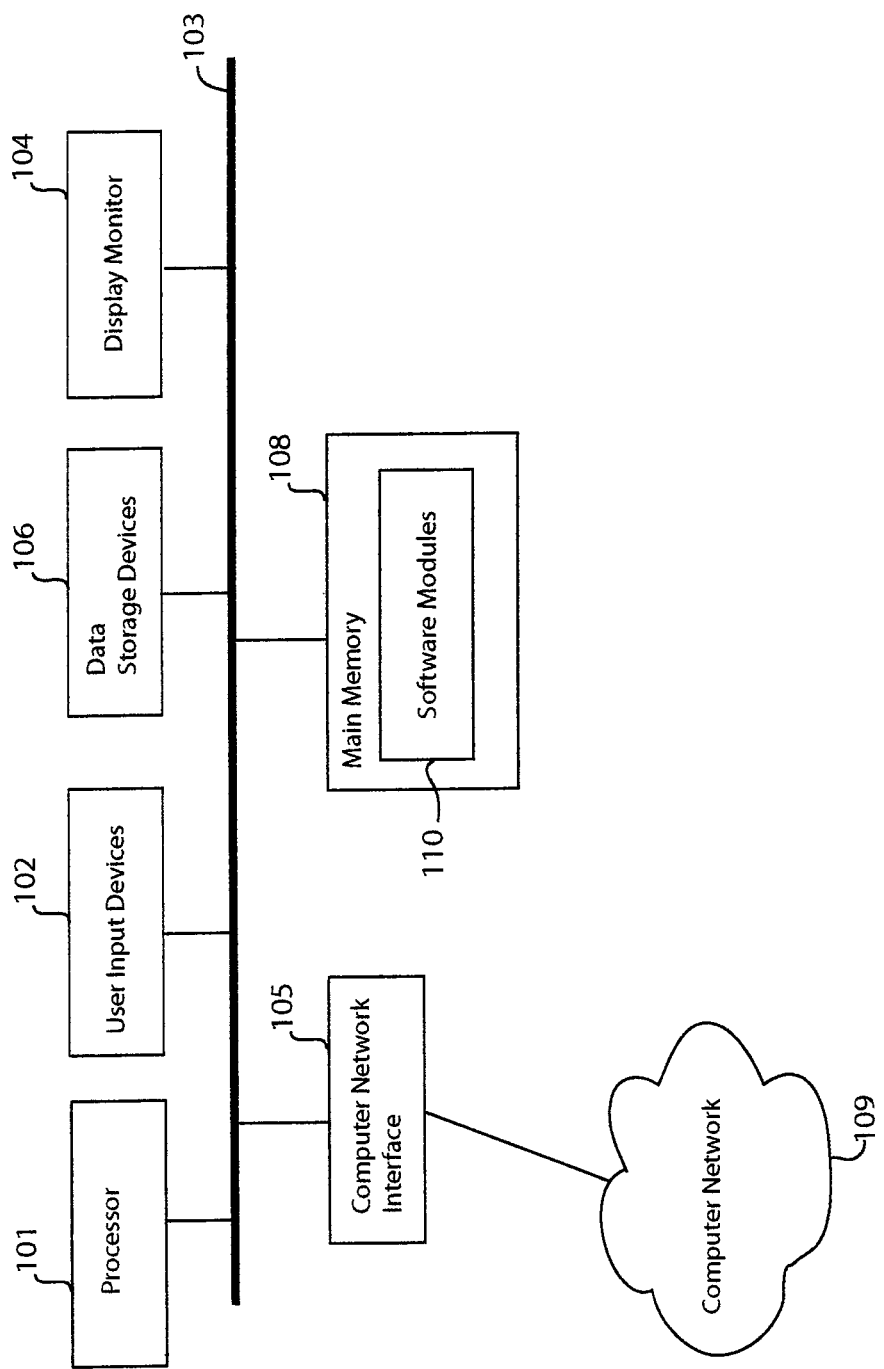
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a training computer 200 (FIG. 2) or application computer 300 (FIG. 3), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 1, the main memory 108 includes software modules 110, which may be software components of the training computer 200 or application computer 300. The software modules 110 may be loaded from the data storage device 106 to the main memory 108 for execution by the processor 101. The computer network interface 105 may be coupled to a computer network 109, which in this example includes the Internet.

As will be more apparent below, embodiments of the present invention allow for authentication of an unknown party (i.e., not certified by a certificate authority or other certifying party) without necessarily having to rely on a public white list of trusted parties. These embodiments preferably authenticate unknown parties locally without necessarily having to access the public white list. These embodiments may also off-load authentication to a remote server computer that can authenticate an unknown party also without necessarily having to access the public white list. As can be appreciated, in the art of computer network communications, a "party" may refer to a computer or the operator (e.g., individual or corporate owner or user) of the computer depending on context.

Figure 2:
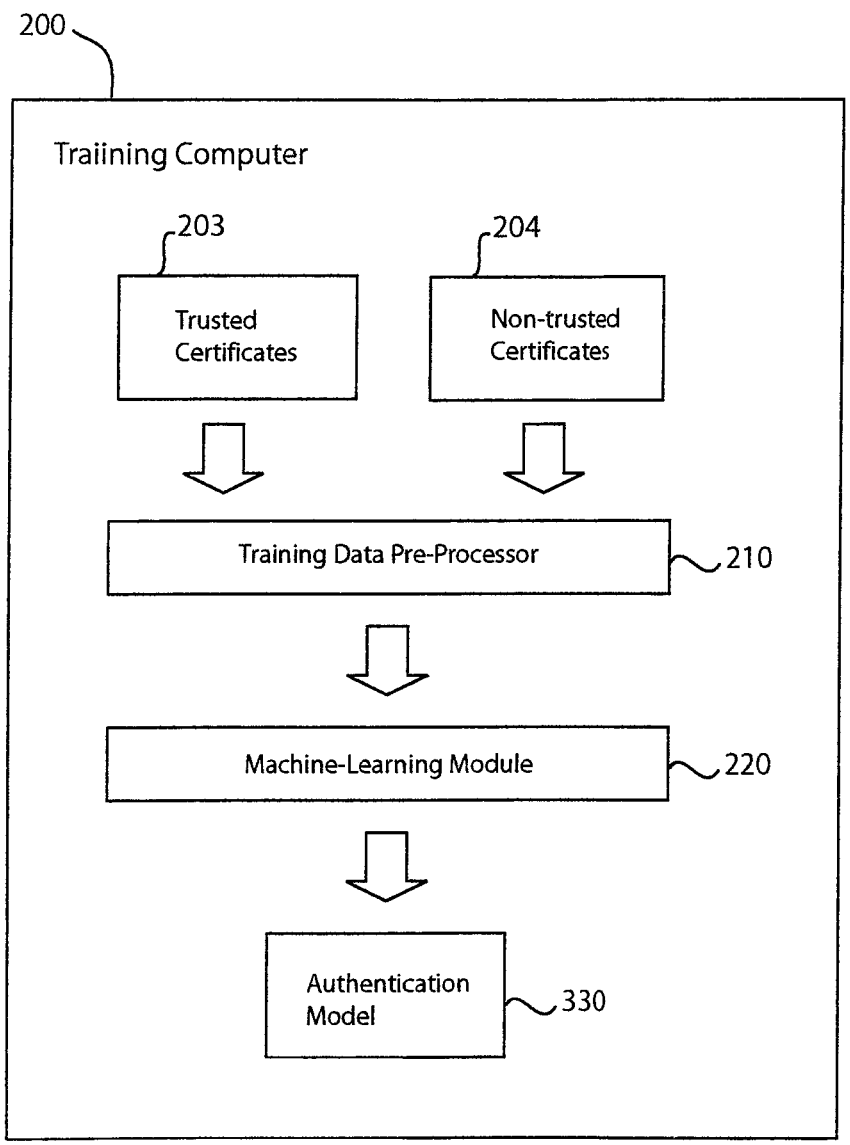
FIG. 2 schematically shows a training computer in accordance with an embodiment of the present invention.

FIG. 2 schematically shows a training computer 200 in accordance with an embodiment of the present invention. The training computer 200 may comprise the computer 100 with the following software modules: training data pre-processor 210 and machine-learning module 220.

Figure 3:
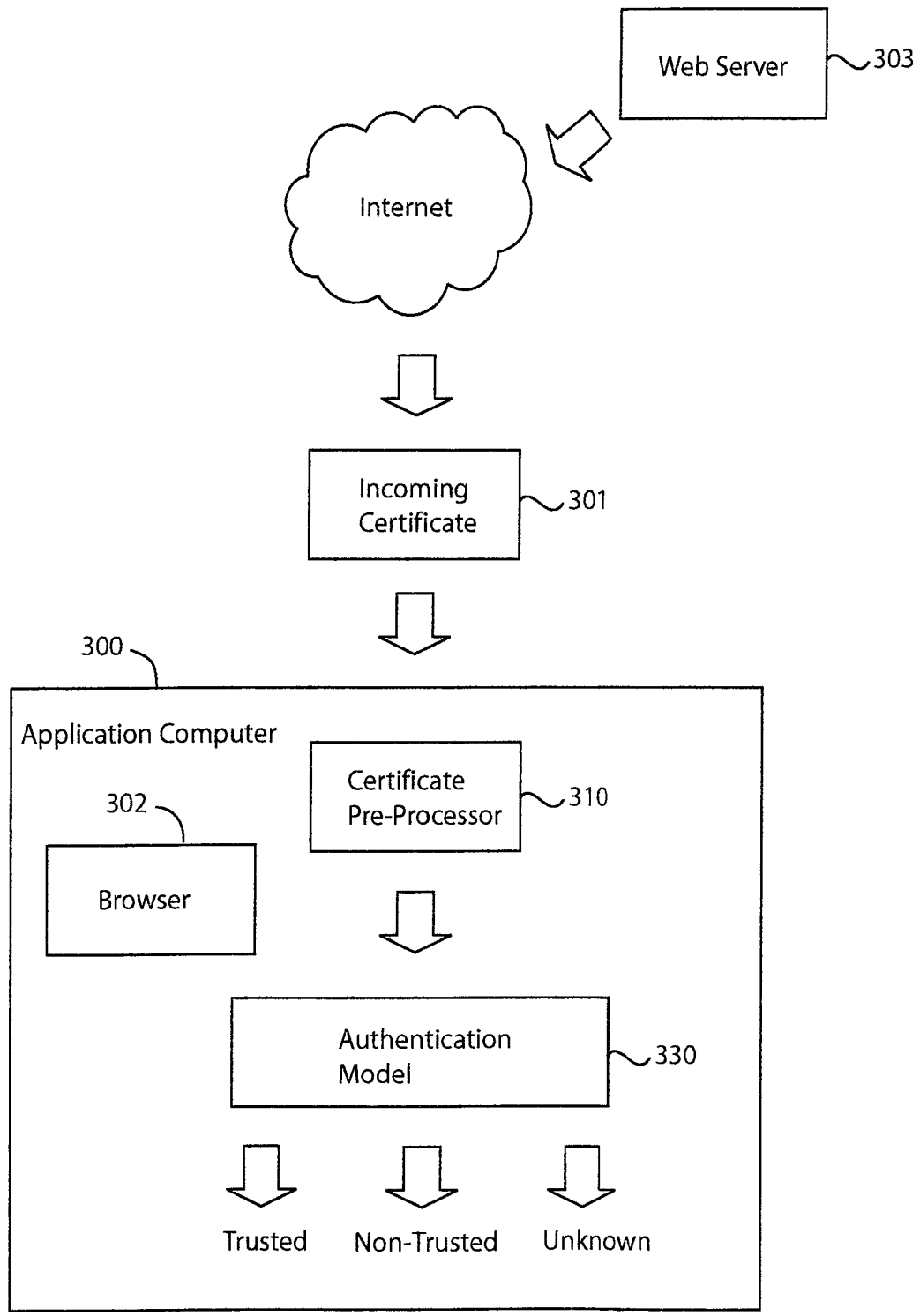
FIG. 3 schematically shows an application computer in accordance with an embodiment of the present invention.

The machine-learning module 220 may comprise computer-readable program code for creating an authentication model 330. In one embodiment, the machine-learning module 220 takes trusted certificates 203 and non-trusted certificates 204 as training data for training the machine-learning module 220 to classify an input digital certificate as trusted or non-trusted. The trusted certificates 203 and the non-trusted certificates 204 may comprise known trusted and non-trusted SSL digital certificates, respectively. A trusted digital certificate is one that can be relied on to establish the identity or trustworthiness of a party. Conversely, a non-trusted digital certificate is one that cannot be relied on to establish the identity or trustworthiness of a party. The result of the training, the authentication model 330, may be employed to classify a certificate in the application computer 300 (FIG. 3). In one embodiment, the machine-learning module 220 comprises a support vector machine (SVM). Any suitable support vector machine software may be employed to implement the machine-learning module 220 including LIBSVM and Spider SVM software. Other machine-learning approaches may also be used (e.g., neural networks) without detracting from the merits of the present invention.

The training data pre-processor 210 may comprise computer-readable program code for converting training data into a form suitable for input to the machine-learning module 220. In the example of FIG. 2, the training data pre-processor 210 is configured to convert the trusted certificates 203 and the non-trusted certificates 204 into vector form. In one embodiment, the training data pre-processor 210 extracts the different fields of an SSL digital certificate, reduces the fields to an unsigned integer using a hash function (or simply use the public key in the certificate as a hash value), and forms the hashes of the different fields into a vector for input to the support of vector machine of the machine-learning module 220. That is, the hashes of the different fields are used as features of the vector. Examples of digital certificate fields that may be used as features in a vector include the public key in the certificate and the certificate authority's public key.

The machine-learning module 220 may take resulting vectors from the pre-processor 210 and use its support vector machine to create a maximum-margin hyperplane that lies in a transformed input space. Given examples of trusted digital certificates in the form of the trusted certificates 203 and examples of non-trusted digital certificates in the form of the non-trusted certificates 204, the maximum-margin hyperplane splits the examples, such that the distance from the closest examples (the margin) to the hyperplane is maximized. If there exists no hyperplane that can split the trusted and non-trusted digital certificate examples, the support vector machine will choose a hyperplane that splits the examples as cleanly as possible, while still maximizing the distance to the nearest cleanly split examples.

In the preferred embodiment where the machine-learning module 220 comprises a support vector machine, the authentication model 330 may comprise a support vector machine model that may be applied in the application stage to classify an incoming digital certificate as trusted, non-trusted, or unknown (i.e., cannot be classified as either trusted or non-trusted). Generally speaking, the process of classifying the incoming certificate involves determining where the incoming certificate lies in the transformed input space. If the incoming certificate is on the side of the hyperplane along with the trusted digital certificate examples, then the incoming certificate may be deemed as trusted. Similarly, if the incoming certificate is on the side of the hyperplane along with the non-trusted digital certificate examples, then the incoming certificate may be deemed as non-trusted. Otherwise, if the model 330 cannot classify the incoming certificate (e.g., due to insufficient training), the incoming certificate may be deemed as unknown.

FIG. 3 schematically shows an application computer 300 in accordance with an embodiment of the present invention. Whereas the training computer 200 is employed to train the machine-learning module 220 during the training stage of a system for authenticating an unknown party, the application computer 300 is employed during the application stage of the system. In one embodiment, the application computer 300 is configured to locally process a digital certificate to determine if an unknown party without an authenticating certificate authority is trustworthy even without necessarily having to consult a public whitelist of trusted parties.

In the example of FIG. 3, the application computer 300 comprises a client computer. The application computer 300 may comprise the computer 100 with the following software modules: a web browser 302, an incoming digital certificate pre-processor 310, and the authentication model 330. The web browser 302 may comprise a commercially available web browser, such as the Microsoft Internet Explorer™ web browser.

The certificate pre-processor 310 may comprise computer-readable program code for converting an incoming digital certificate 301 to a form suitable for input to the authentication model 330. In the preferred embodiment where the authentication model 330 comprises a support vector machine model, the certificate pre-processor 310 converts the incoming certificate 301 into a vector. Similar to the pre-processor 210 of FIG. 2, the certificate pre-processor 310 may extract the different fields of the incoming digital certificate 301, reduce the fields to an unsigned integer using a hash function, and form the hashes of the different fields into an input vector for input to the authentication model 330. The authentication model 330 receives and processes the input vector to classify the incoming certificate 301 as either trusted, non-trusted, or unknown digital certificate. The authentication model 330 may be created in the training computer 200 and distributed to various application computers 300 by a computer security vendor (e.g., Trend Micro Inc.) as a stand alone module or library or as part of a firewall, anti-virus, web browser or other computer communication product.

In an example operation, the application computer 300 may be communicating with the web server 303 over the Internet. The web server 303 may comprise a web site in communication with the browser 302. For example, a user of the application computer 300 may be performing an online financial or confidential transaction with the web server 303 over the Internet. To initiate secure computer communication with the application computer 300 in accordance with the SSL protocol, the web server 303 sends its SSL certificate, referred to herein as incoming certificate 301, to the application computer 300. The application computer 300 proceeds to authenticate the incoming certificate 301 to determine the trustworthiness or identity of the web server 303.

In the example of FIG. 3, the web server 303 is an unknown party without a trusted certificate authority. For example, the web server 303 may not be authenticated by the Verisign or Comodo company or other popular and well recognized certificate authorities. The certificate pre-processor 310 receives the incoming certificate 301 in the application computer 300, where it converts the incoming certificate 301 into an input vector having fields (hashed versions in this example) of the incoming certificate 301 as features. The authentication model 330 receives the input vector from the certificate pre-processor 310 and uses the input vector to classify the incoming certificate 301 as either trusted, non-trusted, or unknown. Information from this classification may be employed to protect the application computer 300 from online security threats. For example, the web browser 302 may be configured to prevent secure communication with the web server 303 if the authentication model 330 deems the incoming certificate 301 as non-trusted or unknown.

Improved techniques for authenticating an unknown party for secure computer communications have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for authenticating a party for secure computer communication, the system comprising:
   a first computer configured to create a model for determining whether a digital certificate is a trusted or non-trusted digital certificate;
   a second computer in communication with a third computer over a computer network, the second computer being configured to convert an incoming digital certificate into an input data and input the input data into the model created in the first computer to determine whether the incoming digital certificate provided by the third computer to the second computer to initiate secure communication in accordance with a secure computer communication protocol is a trusted or non-trusted digital certificate, the third computer being an unknown party that is not authenticated by a trusted certificate authority;
   wherein the second computer is configured to extract fields of the incoming digital certificate and provide the extracted fields to the model; and
   wherein the second computer is configured to take a hash of the extracted fields prior to providing the extracted fields to the model.

2. The system of claim 1, wherein the incoming digital certificate comprises an SSL certificate.

3. The system of claim 1, wherein the secure computer communication protocol comprises the SSL protocol.

4. The system of claim 1, wherein the second computer is further configured to use the model to determine if the incoming digital certificate comprises an unknown digital certificate.

5. The system of claim 1, wherein the second computer includes a web browser in communication with the third computer, the third computer comprising a web server.

* * * * *